UNITED STATES PATENT OFFICE.

CONRAD SEMPER, OF PHILADELPHIA, PENNSYLVANIA.

PROCESS OF MAKING POROUS ALUM.

SPECIFICATION forming part of Letters Patent No. 345,604, dated July 13, 1886.

Application filed July 22, 1885. Serial No. 172,289. (No specimens.)

*To all whom it may concern:*

Be it known that I, CONRAD SEMPER, of the city and county of Philadelphia, and State of Pennsylvania, have invented a new and useful Improvement in the Manufacture of a Sizing Compound for Paper-Makers' Use, of which the following is a specification.

The object of my invention is the production directly from ferruginous aluminous materials—such as clays, schists, and bauxite—of a porous sulphate of alumina, free, or almost free, from iron, and consisting chiefly of sulphate of alumina and water of hydration. I do not confine myself to any particular aluminous raw material containing iron. I prefer, however, to use the mineral called "bauxite."

The following is a convenient method of practicing my invention. Into a leaden pan heated in any convenient manner a quantity of sulphuric acid is drawn, sufficient room being allowed for the swelling and foaming of the mass during the operation. To the acid, while yet cold, the necessary quantity of powdered bauxite is introduced. The quantity which will be necessary will vary of course with the chemical composition of the bauxite; but in order to insure a basic solution in all cases I use bauxite in excess. A violent action will soon take place, during which it may be necessary to sprinkle small quantities of water, or weak liquors from previous operations, over the mass to prevent overflow. The mass will presently subside. It is to be kept in a semi-fluid or pasty condition until a test by sample shows basisity. The pans and their contents are now allowed to cool, or a quantity of water may be added to make a solution which will not harden when cold. If allowed to cool in the pans, the hard mass may be removed therefrom to other vessels, where a solution can be effected.

Another method of making the solution is as follows: Into a vessel of suitable dimensions, preferably lead-lined and with sloping sides, sulphuric acid is introduced, preferably of a density of 50° Baumé, more or less. This acid is heated to about 200° Fahrenheit, and into it the required quantity of ground bauxite is quickly stirred. In this case, however, a larger proportion of bauxite must be used to obtain basic solutions, as a considerable proportion of the bauxite will escape being acted upon by the acid on account of the rapidity of the process. For this reason, also, a constant and certain degree of basisity cannot be depended on. On the contrary, it may occasionally happen that even with an increased proportion of bauxite a sour solution will result. After a solution of basic ferruginous sulphate of alumina has been obtained, or, if said solution is not already basic, after it has been made basic by the use of precipitated hydrate of alumina, or by some other means, it is cleared from the insoluble impurities by subsidence, filtration, or other means. The clear solution of basic ferruginous sulphate of alumina, which is generally of a dark-yellow color, is now placed in suitable vessels or tanks, preferably lead-lined, in which it is subjected to the action of plumbic dioxide, manganic dioxide, or sesquioxide, manganates or permanganates, or stannic acid, or any other substance which will precipitate ferric oxide in an insoluble form. In case iron is present in the solution in the form of ferrous oxide, it will be advantageous to oxidize it to ferric oxide, by a cheap oxidizing agent, prior to the above treatment, as otherwise the ferrous oxide will be oxidized at the expense of part of the above-named precipitants. After the introduction of the precipitant the mixture is thoroughly stirred up and a sample is taken to test whether iron be still present. If it remains in considerable quantities, more of the precipitant is introduced until all or nearly all of the iron has been removed. The liquor is now cleared of insoluble particles by filtration or by subsidence, and is then drawn off into suitable vessels for evaporation. When it has been sufficiently concentrated to form when cold a hard substance—say to a density of from 60° to 65° Baumé, (more or less,) it is allowed to cool until it becomes semi-fluid or pasty. A small quantity of bicarbonate of soda—say from one to three pounds (more or less) to every one thousand pounds of finished product—is now introduced and briskly stirred into the mass. Carbonic-acid gas will at once be freed by the action of the hot sulphate-of-alumina solution on the bicarbonate of soda, and will permeate and transform the mass into a porous structure.

Letters Patent No. 257,567 have been granted to C. Fahlberg and myself; also Letters Patent Nos. 264,773 and 264,774 have been granted to me for an improvement in the manufacture from ferruginous solutions of sulphate of alumina of sulphate of alumina free from iron.

I am also aware that Letters Patent No. 82,747 were granted to Henry Pemberton, of Allegheny City, Pennsylvania, for porous alum.

I do not confine myself to the use of bicarbonate of soda, as any other material or agent which will produce a porous condition of the mass may be employed.

Having thus described my invention, what I claim, and desire to secure by Letters Patent, is—

1. The process described of manufacturing a porous material for paper-makers' use, consisting, essentially, of sulphate of alumina and water, and free or nearly free from iron, as described.

2. The process described of manufacturing from any aluminous material containing iron a porous material for paper-makers' use containing sulphate of alumina and water, and free or nearly free from iron, as described.

3. The process described for producing from any aluminous substance containing iron a porous compound for paper-makers' use containing sulphate of alumina and water, and free or nearly free from iron, said process consisting, essentially, in treating a ferruginous solution of sulphate of alumina with plumbic dioxide or other oxide of lead, or with dioxide or sesquioxide of manganese, or with permanganate of potash, or other substance that will precipitate iron from aluminous solutions, then removing from said solution any insoluble matter which may be contained therein, by subsidence or by filtration or other convenient means, then adding to said solution in a sufficiently cool and concentrated condition bicarbonate of soda, and finally crushing the vesicular mass thus obtained into lumps of the desired size.

In testimony whereof I have hereunto signed my name this 17th day of July, A. D. 1885.

CONRAD SEMPER.

In presence of—
WM. C. STRAWBRIDGE,
J. BONSALL TAYLOR.